United States Patent [19]

Yano

[11] Patent Number: 4,872,246
[45] Date of Patent: Oct. 10, 1989

[54] ROLL WITH AN ARCHED SHAFT

[76] Inventor: Akechi Yano, 2, Kikusuidori 4-chome, Moriguchishi, Osakafu, Japan

[21] Appl. No.: 296,289

[22] Filed: Jan. 11, 1989

Related U.S. Application Data

[63] Continuation of Ser. No. 14,887, Feb. 13, 1987, abandoned.

[30] Foreign Application Priority Data

Jul. 3, 1986 [JP]  Japan .................................. 61-51090
Jul. 3, 1986 [JP]  Japan .................................. 61-51091

[51] Int. Cl.⁴ .............................................. B21B 13/02
[52] U.S. Cl. ..................................... 29/116.1; 29/122; 29/132
[58] Field of Search .................. 29/116.1, 116.2, 122, 29/125, 129.5, 132

[56] References Cited

U.S. PATENT DOCUMENTS

| | | | |
|---|---|---|---|
| T967,010 | 2/1978 | Stryjewski | 29/122 |
| 1,137,713 | 10/1919 | Linder | 29/122 |
| 1,338,178 | 4/1920 | Henderson | 29/122 |
| 2,732,591 | 1/1956 | Whittum | 29/122 |
| 3,168,435 | 2/1965 | Beachler | 162/348 |
| 3,728,767 | 4/1973 | Shirai | 29/116 AD X |
| 3,729,788 | 5/1973 | Tawa | 29/116 AD X |
| 3,786,975 | 1/1974 | Heymanns | 29/125 X |
| 3,831,239 | 8/1974 | Hoff et al. | 29/125 |
| 3,884,623 | 5/1975 | Slack | 29/122 |
| 4,068,360 | 1/1978 | Frueler | 29/116 AD |
| 4,253,392 | 3/1981 | Brandon et al. | 29/122 |
| 4,305,191 | 12/1981 | Enomoto | 29/116 AD |
| 4,311,509 | 1/1982 | Reader et al. | 29/125 X |
| 4,376,643 | 3/1983 | Kahle et al. | 29/125 |
| 4,414,890 | 11/1983 | Schiel et al. | 29/115 X |
| 4,502,312 | 3/1985 | Marchinon | 29/113 AD X |

*Primary Examiner*—Mark Rosenbaum
*Assistant Examiner*—Frances Chin
*Attorney, Agent, or Firm*—Armstrong, Nikaido, Marmelstein, Kubovcik & Murray

[57] ABSTRACT

A roll comprising a curved shaft upon which is rotatably mounted an elastic roller which has its circumference increasing progressively from its center to its ends. This results in the roll having a part which is axially straight or slightly curved. The article to be passed contacts the part and passes in a stable manner without distortion or permanent set therein, and receives a force extending the same in its cross-wise direction. This force makes it possible to stretch out any wrinkles in the article to be passed, prevents the wrinkles from forming and, if necessary, to extend the same in its cross-wise direction.

7 Claims, 5 Drawing Sheets

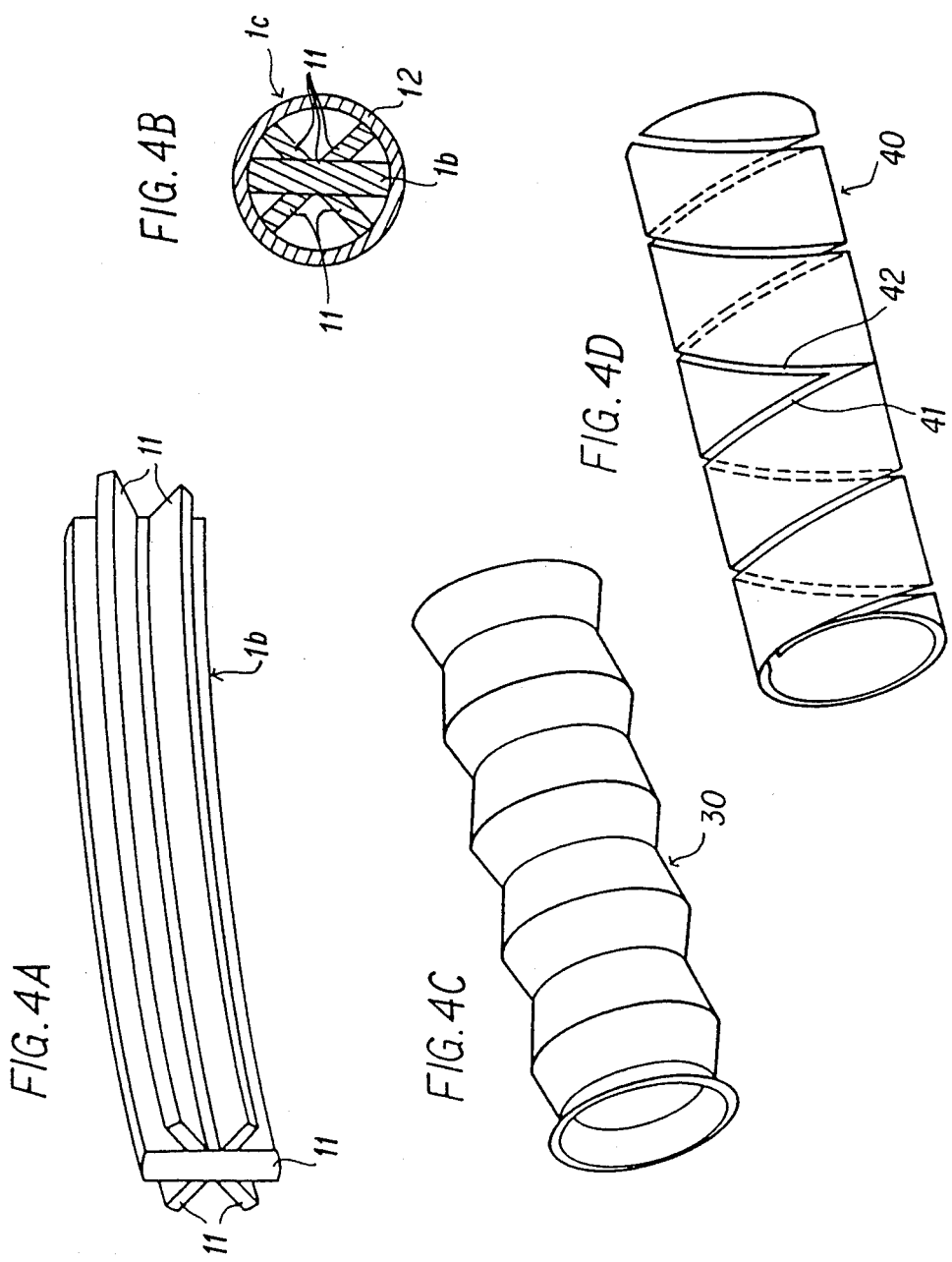

4,872,246

ROLL WITH AN ARCHED SHAFT

This application is a continuation of application Ser. No. 014,887 filed Feb. 13, 1987, now abandoned.

BACKGROUND OF THE INVENTION

1. Field of the Invention

The present invention relates to a roller provided rotatably on an arched roller shaft. More specifically, the invention relates to a roller which adapts the force tending to extend a sheet-shaped article in its cross-wise direction to act on the article passed thereover.

2. Statement of Prior Art

Conventionally, a roll having wrinkle stretching function or a wrinkling prevention function is shown in FIG. 7A. The known roll R4 has a roller 2d, whose external circumference increases progressively from the central part towards each end, and which is rotatably provided on the straight roller shaft 1d. Nevertheless, such a drum-shaped roll has a disadvantage wherein, if the article S to be passed by the roller 2d makes a wide contact (Sa part) with the roller 2d, the article S may be distorted and given a permanent set. Further, if the difference between the external circumference around the central part of the roller 2d and that around the opposite end parts thereof is increased to increase the force extending the article S in its cross-wide direction, there is difficulty in causing the article S to travel in a stable manner.

On the other hand, as shown in FIG. 7B, the roll R5 wherein the roller 2e has a constant sectional area and is rotatably provided on a curved or arched roller shaft 1e has been also known. As shown in FIG. 7C, if the article S is passed from the concave side of the roller shaft 1e to the convex side, then a force extending the article S in its cross-wise direction acts on the article. Nevertheless, if the degree of curvature of the roll is enlarged in order that the force of extending be increased, then the article may be given a large permanent set and also there is a difficulty in causing the article to travel in a stable manner.

For this reason, Conventionally, any of the aforementioned rolls can only be used with an extremely soft material such as plastic film, without giving rise to wrinkles.

SUMMARY OF THE INVENTION

The purpose of the present invention is to provide a new type roll which has the roller, whose external configuration forms the drum-shape into a different shape, provided rotatably on the arched roller shaft and cause the force extending the article in its cross-wise direction to act upon the article.

Another purpose of the present invention is to provide the roll wherein the article to be passed can travel on the surface layer of the roller with a wide contact made between them and, in that case, a distorted (cross-wise irregular) permanent set rarely occurs.

A further purpose of the present invention is to provide the roll which can travel the article to be passed thereon in a stable manner.

A still further purpose of the present invention is to provide the roll whose structure has an advantageous feature in arranging a pair of rolls opposite to each other.

BRIEF DESCRIPTION OF THE DRAWINGS

FIG. 4A is a perspective view of a roller shaft for an embodiment of a roll according to the present invention, and FIG. 4B is an end view of a further roller shaft according to the present invention;

FIG. 4C is a perspective view of another constituent member of the roller in the roll according to the present invention, and FIG. 4D is a perspective view of a further constituent member of the roller in the roll according to the present invention;

DETAILED DESCRIPTION OF THE PREFERRED EMBODIMENT OF THE INVENTION

The roll according to the present invention comprises a roller whose external configuration has its external circumference increased progressively in an axial direction from the central part of the roller toward the opposite ends of the roller and a curved or arched roller shaft which supports the roller in a rotatable manner.

Figure 1A:
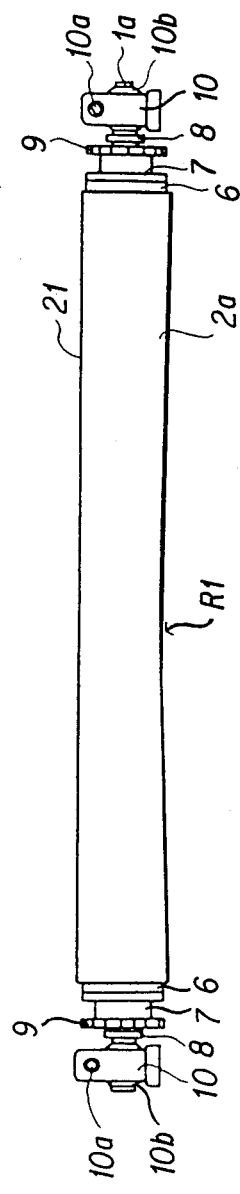
FIG. 1A is a side view of an embodiment of the present invention wherein a portion of the external periphery of the roller forms an axial straight line and FIG. 1B is a partially enlarged sectional view of the left half roll of FIG. 1A.
Figure 1B:
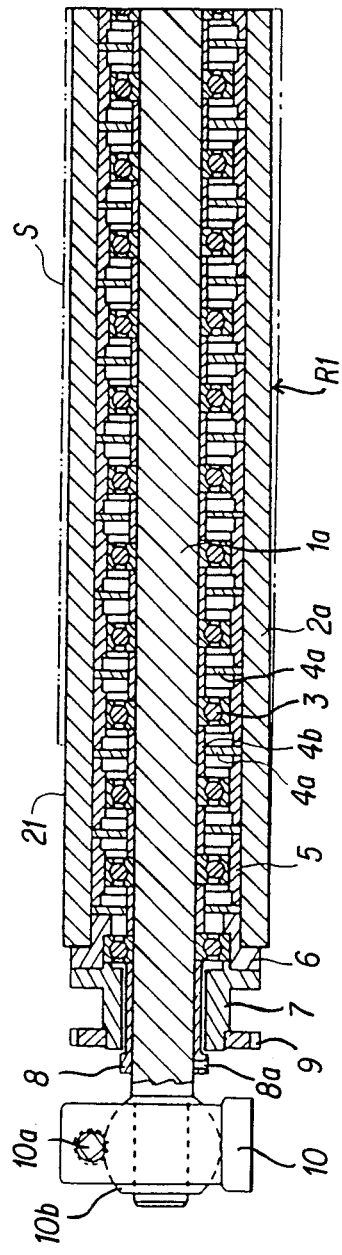

A description of the embodiment will be made in conjunction with the accompanying drawings as follows:

In FIG. 1A, the roll R1 comprises a curved roller shaft 1a and a sheet rubber roller 2a. As shown in FIG. 1B, the sheet rubber roller 2a is rotatably mounted on a plurality of casing 5 housing bearings 3 on the roller shaft 1a. Ring-shaped spaces 4a of constant thickness are provided between the casings 5. The external configuration of the rubber roller 2a is such that its outer circumference gradually increases progressively in an axial direction from its central part toward its opposite end parts. The overall configuration is such that when the curved roller shaft 1a is concave downwardly, the upper axial line of FIG. 1A is formed axially as a straight line.

Sleeves 4b are fitted onto the roller shaft 1a so that gaps may be made between the bearings 3 and the roller shaft 1a. End flanges 6 are fitted in the end parts of the rubber roller 2a. Set flanges 7 are mounted on the external sides of the end flanges. Set sleeves 8 are fitted onto the roller shaft 1a. Screw holes 8a are provided through which the set sleeves 8 are fixed to the roller shaft 1a. Gears 9 transmit a drive force for rotation of the roller 2a. Units 10 for adjusting the shaft angle and forming part of a roll supporting device, are provided on both ends of the roll. The units 10 comprise rotatable spherical members 10b and screw shafts 10a which are screwed into tapped grooves on the external periphery of the respective sperical members 10b, permit rotation of the spherical member 10b, together with the roller shaft 1a mounted thereon.

Figure 2:
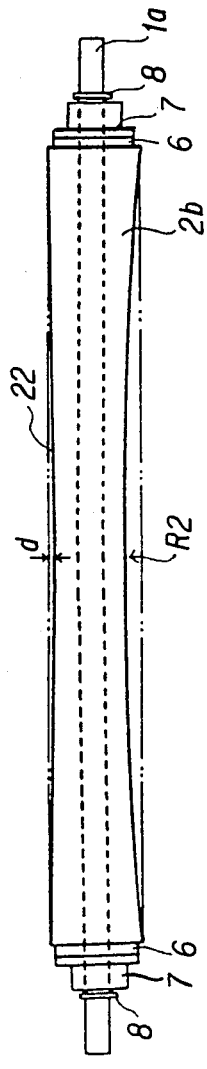
FIG. 2 is a side view of another embodiment of the present invention wherein a portion of the external periphery of the roller forms an axial line with a concave catenary curve.

In FIG. 2, the roll R2 comprises a roller 2b and a curved roller shaft 1a. In this case, the configuration is such that the curved roller shaft 1a is arranged to be concave downward and the upper axial line of the roll forms axially a concave catenary line. Except for the external configuration of the roller 2b being different from that of the roller 2a, the roll R2 has the same construction as that of the straight type roll R1 of FIGS. 1A and 1B.

Figure 3A:
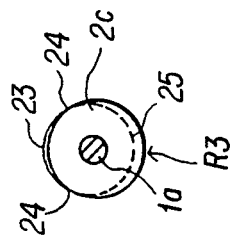
FIG. 3 is a side view of a further embodiment of the present invention wherein a portion of the external periphery of the roller forms an axial line with a convex curve.
FIG. 3B is an end view of the structure of the roller of FIG. 3A.
FIG. 3C is an outline view of the state where the article to be passed travels around the roller of FIG. 3A.
Figure 3B:
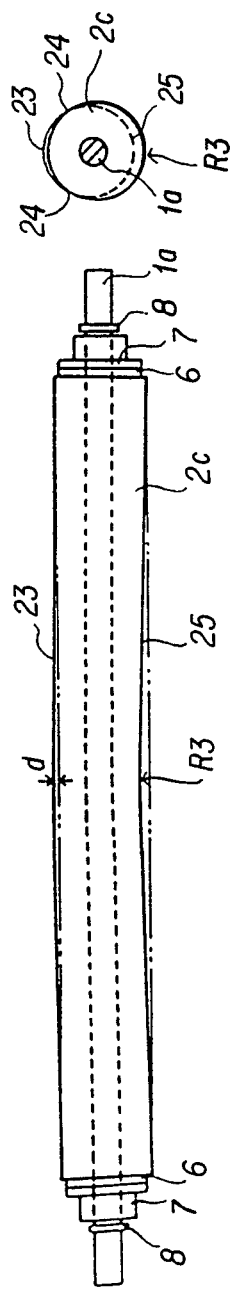

The roll R3 of FIG. 3A comprises a roller 2c and a curved roller shaft 1a. In this case, the configuration of the roll R3 with the curved roller shaft 1a arranged concave downwards, the upper axial line 23 of the roll forms axially a slightly convex curved line. Except for the external configuration of the roller 2c being different from that of the roller 2a, the roll R3 has the same construction as that of the straight type roll of FIGS. 1A and 1B. As shown in FIG. 3B. the roll R3 has an axial line which is axially straight, between the slightly convex upper axial line 23 of the upper part of the roller and a lower concave axial line 25, whose degree of curvature is larger than that of the line 23.

The roll according to the present invention may be made, for example, by the following method: First, the rubber roller 2a, which is initially formed to be thick enough to allow for some thickness to be cut from it, is rotatably mounted, for example, by way of an intermediate member such as bearing case, roller, bellows-shaped cylinder, (FIG. 4C), cylinder having a spiral groove, (see FIG. 4D), or a rotation-proof member, or a rotation auxiliary member such as normal or self-aligning type ball bearing and sliding bearing, if necessary, on the roller shaft which is in the predetermined curved state. Next, the roller 2a is horizontally installed such that the roller shaft has a vertical elevation projection with a curve corresponding to the required curve. Subsequently, when so fixed, the predetermined part on the surface layer of the roller 2a, which is continuously fed as the upper part of the roller 2a during the rotation of the roller 2a, is cut by a cutting means which is moved over the roller at the required predetermined distance such that the part of the roller 2a coming to the top during rotation of the roller axially forms the straight line (Roll R1), the predetermined concave catenary curve (Roll R2), or the predetermined convex curve (Roll R3).

The roller shaft in each of the embodiments according to the present invention is curved, whereby, while some part of the external periphery of the roller contains or defines axially flattened line, the external appearance of the roller at its stationary state is identical to that of such a roller when rotated. It is accepted that the degree of a curvature of the roller shaft is limited by the fact that the roller to be provided on the roller shaft must be rotatable with respect to the roller shaft. Generally speaking, the radius of curvature of the roller shaft is 9 mm–400 m, preferably 18 mm–200 m, or more preferably 36 mm–100 m. In proportion to an enlargement of the radius of curvature of the roller shaft, the difference between the circumference of the central part of the roller and that of the opposite ends thereof can be progressively enlarged. No special limit is put on the length and diameter of the roller shaft. Generally, while the length thereof is 8 mm–20 m, preferably 12 mm–10 m, more preferably 15 mm–6 m, the diameter thereof is 1 mm–5 m, preferably 2 mm–2 m, more preferably 5 mm–1 m.

No special limit is put on the sectional structure and the specifications of the roller shaft. An acceptable option is a round-shape as illustrated in the afore-mentioned embodiment. An alternative type, wherein the weight is reduced and the bending strength is substantially increased, is shown in FIG. 4A and comprises a bar 1b formed by a plurality of plate-shaped members 11 combined with one another such that their sectional view becomes radial as shown in FIG. 4A. In FIG. 4B, a bar 1b is housed in a pipe 12, to form a roller shaft 1a capable of being cooled by passing cooling fluid through it axially.

The roller in the embodiments according to the present invention has the circumference increasing (drum-shaped) progressively in the axial direction from its central part toward its opposite end parts, thereby obtaining a roll wherein a force tending to extending the article across the roll acts upon the article in its crosswise direction. As illustrated in the embodiments of FIGS. 1A, 2, and 3A, the roller has an external configuration wherein some part of the external periphery of the roller contains or defines an axially straight line, whereby the article can pass across the roller while remaining at least approximately flat. A simple requirement laid on the roll according to the present invention is that within the scope wherein a shadow picture made by a vertical elevation projection of the curved roller shaft provides the center line of the roller shaft with a degree of curve, the external peripheral line of the upper part of the roller is formed as a straight line (straight type), the concave catenary curve (concave type), or a convex curve (angle type).

The roll according to the present invention is deformed during the rotation of the roller around the roller shaft, thereby enabling the roller to be rotated. The deformation of the roller may be classified into an amplitude type and an elasticity type. In the amplitude type, the axial degree of curvature of the external surface of the roller during the rotation of the roller around the roller shaft gives rise to an amplitude alteration in a radial direction. This effect can be obtained by, for example, forming the surface layer of the roller as a cylinder comprising a plurality of parallel plates so that the surface layer of the roller can axially slide with respect to the internal members, such as the casings 5 of FIG. 1B which make contact with plates during the rotation of the roller and, at the same time, alter the degree of curvature. On the other hand, in the elasticity type, the surface layer of the roller is for example, made of rubber, soft metal or soft ceramic and is axially elastic in response to the angle of rotation of the roller which is correspondingly rotated around the roller shaft. The rolls R1, R2, and R3 are of the elasticity type and each part of the rubber roller 2a responds elastically to the angle of rotation of the roller rotated around the roller shaft 1a. It is possible that the roller of the elasticity type results in the roll which is smoothly rotated around the roller shaft.

For this reason, the surface layer of the roller is formed by material which allows the deformation as an alteration of the degree of curvature or by the flexibility in the case of the afore-mentioned amplitude type. It is constituted by the rubber-like elastic material in the case of the elasticity type. Examples of the material for forming the surface layer of the roller include materials such as wood, rubber (rubber-lining), plastic, and ordinary metal, the rubber-like and elastic metals such as Ni-Ti alloy, Cu-Zu-Al alloy and the like, and ceramic. The rubber-like metallic, such as soft metal, and ceramic type rollers such as soft ceramic are preferred for preventing sliding of the article to be passed and preventing dust adhesion caused by heat resistance, and conductivity, respectively. An acceptable option is that the roller has its external periphery formed with grooves and/or projections for fluid drainage and preventing slipping. A further option is for the roller to have its surface covered with a known cover such as cloth or sponge.

No special limit is put on the dimension of the roller. Generally, the length thereof is 4 mm–18 m, preferably 8 mm–9 m, more preferably 10 mm–5 m. The maximum circumference (on both the end parts) thereof is 10 mm–10 m, preferably 20 mm–5 m, more preferably 50 mm–3 m, and the difference between the minimum circumference on the central part and the maximum circumference on the opposite end parts is 0.5 mm–1 m, preferably 1 mm–30 cm, more preferably 1 mm–5 cm.

For the concave type and the convex type, a gap d (FIGS. 2 and 3A) between the roller surface at the central part on the upper part of the roller and the line joining the ends of the roller with each other in the case where the roller shaft is concave downwards is, generally speaking, preferably 0.1 mm–10 cm.

The roll R1 of FIG. 1A, for example, uses a steel (55C) roller shaft 1a, 1620 mm in length, 25717.7 mm in radius of curvature, and 45 mm in diameter. The roller 2a (having 8–15 mm thickness of rubber) is 120 mm in diameter on the central part 154 mm in diameter on the end parts, and 1200 mm in length. The bearings 3 are of 6210ZZ grade (in conformity with JIS standard). The hardness (shear) of the rubber forming the surface of the roll is ordinarily set at about 35 and at about 80 in the cases where the article to be passed is cloth and metal plate, respectively.

The bellows-shaped cylinder 30 of FIG. 4C and the cylinder 40 having spiral grooves 41 and 42 of FIG. 4D are illustrated as intermediate members provided between the bearing casings and the member forming the surface layer of the roller in the above-mentioned embodiments.

The spiral groove 41 in the cylinder 40 of FIG. 4D is wound clockwise and the spiral groove 42 is wound counterclockwise with the central part of the cylinder 40 as a boundary, so when acted upon by an axial force, the diameter of the cylinder 40 can be reduced by contracting the spiral grooves in response to the rotational speed of the roller. Such an action permits an increase in the strength of the roll upon rotation. For this reason, the roll including these spiral grooves may be advantageously applied to high-speed and large-sized rolls.

The embodiments of the roll according to the present invention utilize a flat (axial straight line) part of the roller when the article is to be passed in a flat or approximately flat state, whereby distortion or permanent set is prevented from taking place or is suppressed, the article can be passed in a stable manner, and the speed can be maximized. Furthermore, there is a possibility not only of passing the article with a wide contact with the surface of the roller, but also of modifying the force tending to extend the article in its cross-wise direction to act advantageously upon the article. As a result, wrinkling of the article to be passed can be prevented or removed, or the width of the article can be extended. The degree of the afore-mentioned action depends upon the relation between the force tending to extend the article in its cross-wise direction of the roll and the strength of the article. Metallic thin plates or foils, plastic films or sheets, and sheet articles such as cloth and paper are usable as articles to be passed.

Figure 3C:
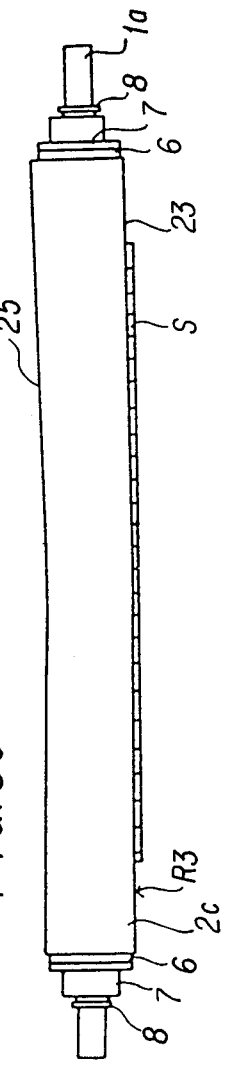

In particular, as shown in FIG. 3C, the role R3 has an advantageous feature wherein the axial curved line 23 can be arranged on the lower side of the roll R3 in the case of passing an article S subject to gravity, whereby the contact width between the article and the surface of the roller 2c can be made wider.

Figure 5:
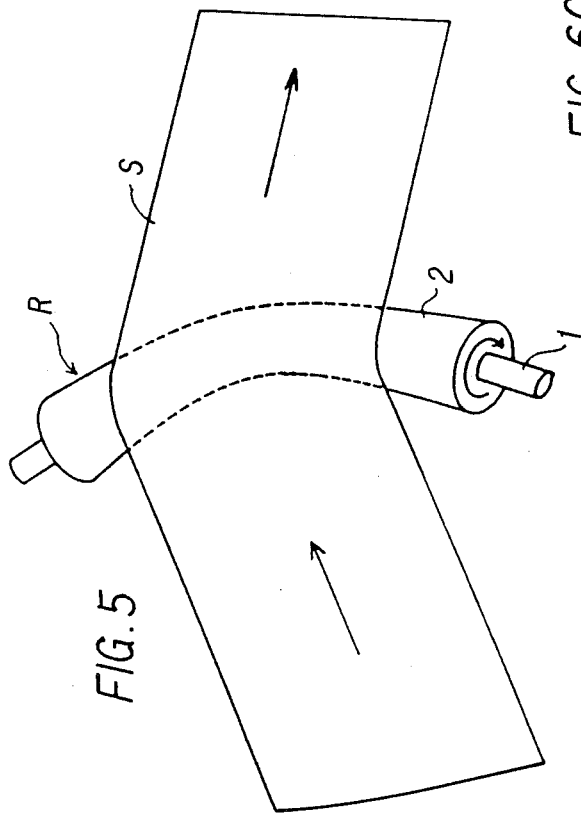
FIG. 5 is a perspective view of the advantageous mode of using the roll of FIG. 3A.
Figure 7A:
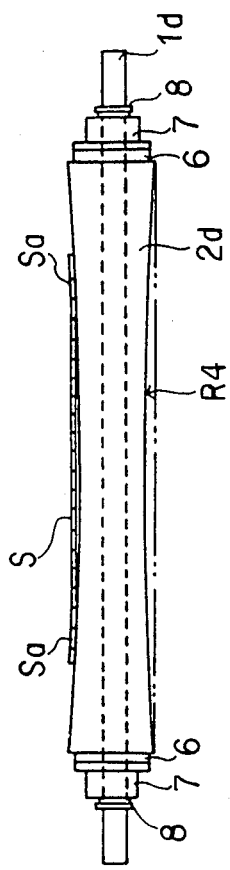
FIG. 7A is a side view of a conventional drum-shaped roll.
Figure 7B:
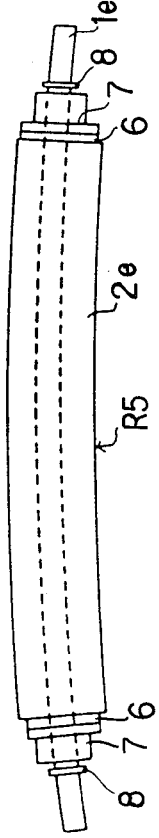
FIG. 7B is a side view of a conventional roll of uniform diameter with an arched shaft.
Figure 7C:
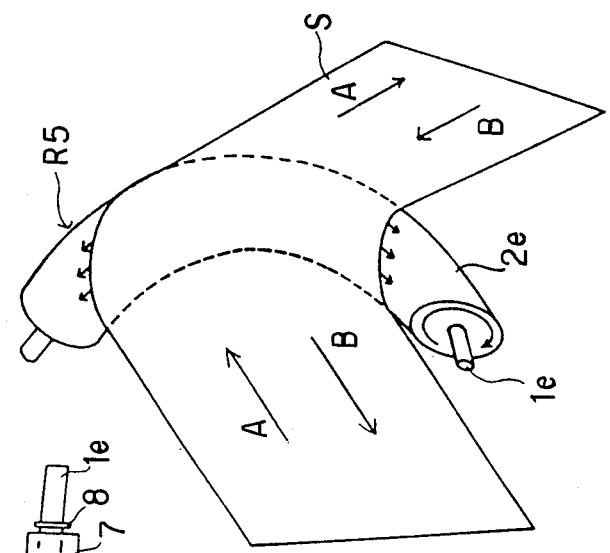
FIG. 7C is a perspective view of the mode using the roll of FIG. 7B.

An advantageous application of the elasticity type roll is, as shown in FIG. 5, to pass the article from the concave side of the roller surface for the convex side thereof. In this case, the change in effective axial length of the roller can be used to change the force tending to extend the article in its cross-wise direction. Namely, the amount of force is increased upon the rotation of the roller while continuously increasing its effective axial length when the article is moved from the concave side of the roller shaft to the convex side of the external diameter thereof, (reversively, the force decreases while the effective axial length continuously decreases when the article is moved from the convex side of the roller shaft to the concave side of the roller shaft). In each case, the force tending to extend the article in its cross-wise direction varies based on the difference in peripheral velocity caused by the difference in the circumference of the roller.

Figure 6A:
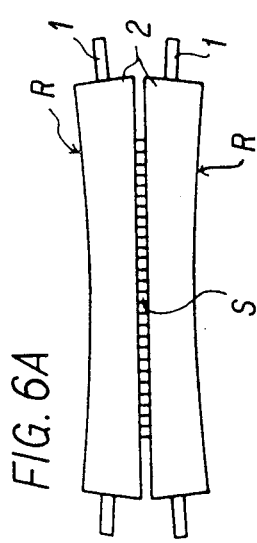
FIG. 6A is an outline view of a pair of rolls according to the present invention arranged opposite to each other with a gap between them.
Figure 6B:
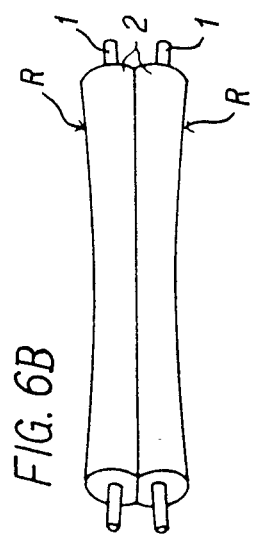
FIGS. 6B and 6C are outline views of a pair of expansion type rolls according to the present invention arranged opposite to each other in a compressed condition.
Figure 6D:
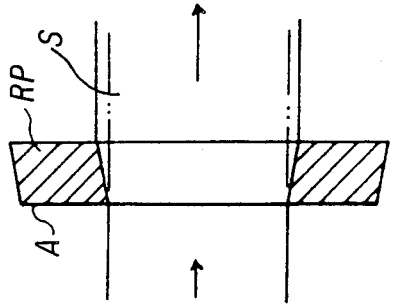
FIG. 6D is a view of the action of extending the article passed between a pair of rolls arranged opposite to each other as shown in FIG. 6C.
Figure 6C:
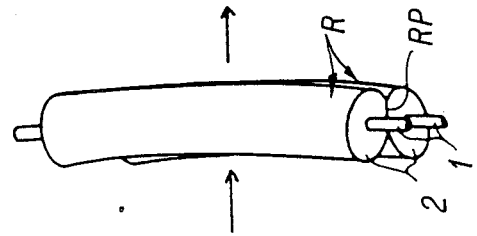

Another advantageous application of the elasticity type roll is, as shown in FIGS. 6A to 6C, to arrange a pair of rolls R oppositely to each other, utilizing the elasticity or the compressibility of the rollers 2. With this system, it is possible to adapt the extending force in the cross-wise direction by having the pair of rolls act upon the article in combining manner. In addition, slipping of the article on the surface of the roller can be prevented, the extending force in the cross-wise direction being much more ensured to act on the article.

In the arrangement of FIG. 6A, the axial straight line parts of the rollers 2 in the roll R opposite to each other with a predetermined gap left therebetween. This arrangement may be applied to a combination utilizing the straight lines 21 and 24 of the straight type rolls R1 and R3, a combination utilizing the catenary curve 22 of the roll R2 and the curved part 23 of the roll R3, and to the amplitude type roll.

FIGS. 6B and 6C have some part of rollers 2 arranged opposite to each other with a contact made therebetween in the state where the contact regions are compressed to be flat. In particular, FIG. 6C has the rollers arranged opposite to each other in the state where they are compressed to be flat in a such manner that it is possible to pass the article S from the concave side of the roll R toward the convex side. In that case, as shown in FIG. 6D, since a restricting force acts on the article S on the side A where it is introduced before being passed over the compressed and flat part RP at which the surface layer of the roller and the article S make contact with each other, the width of the article is restricted and there is the advantageous feature that it is not necessary to use a different roll for restricting the width of the article.

The roll according to the present invention may be used together with a wandering prevention means such, for example, as a crown type roll whose circumference at the central part is greater that at its ends. In that case, it is preferable that the roll according to the present invention is arranged where the wandering prevention force caused by the wandering prevention means is effective.

I claim:

1. A roll for feeding articles comprising:
   a curved support shaft in a fixed position under a no-load condition; and
   a roller mounted to rotate around said curved support shaft without any rotation of said support shaft, said roller having a surface layer and a circumference which increases progressively from a central portion of the roller to the ends thereof, said surface layer deforming with cyclical expansion and contraction in a direction of a width of said roller or deforming with cyclical amplitude alteration in a radial direction while being rotated about said curved support shaft such that at least one axial straight line is defined along an external periphery of said surface.

2. The roll as defined in claim 1, wherein said surface layer is made of a material selected from the group consisting of rubber, metal, plastic, wood and ceramic.

3. The roll as defined in claim 1, wherein said curved support shaft is arranged to be convex and said circumference of said roller is shaped such that said at least one axial straight line is defined along an uppermost portion of said surface layer.

4. The roll as defined in Claim 1, wherein said curved support shaft is arranged to be convex and said circumference of said roller is shaped such that an uppermost portion of said surface layer axially forms a concave curve.

5. The roll as defined in claim 1, wherein said curved support shaft is arranged to be convex and said circumference of said roller is shaped such that an uppermost portion of said surface layer axially forms a slightly convex curve and a pair of said at least one axial straight lines are defined adjacent thereto.

6. The roll as defined in claim 1, wherein said roller comprises a cylinder having spiral grooves formed therein.

7. The roll as defined in claim 1, wherein said roller comprises a bellows-shaped cylinder.

* * * * *

UNITED STATES PATENT AND TRADEMARK OFFICE
CERTIFICATE OF CORRECTION

PATENT NO. : 4,872,246

DATED : October 10, 1989

INVENTOR(S) : YANO

It is certified that error appears in the above-identified patent and that said Letters Patent is hereby corrected as shown below:

On the cover page, Item [30], line 2, "Jul. 3, 1986" should read --Mar. 7, 1986--;

line 3, "Jul. 3, 1986" should read --Mar. 7, 1986--.

Signed and Sealed this

Twenty-fifth Day of December, 1990

Attest:

HARRY F. MANBECK, JR.

Attesting Officer     Commissioner of Patents and Trademarks